April 23, 1963    L. L. HILL    3,086,212
EYE SHIELD HOLDING MECHANISM FOR WELDING HELMETS
Filed Aug. 29, 1960

INVENTOR.
LLOYD L. HILL
BY
Elliott & Pastoriza
ATTORNEYS

United States Patent Office

3,086,212
Patented Apr. 23, 1963

3,086,212
EYE SHIELD HOLDING MECHANISM FOR
WELDING HELMETS
Lloyd L. Hill, Santa Monica, Calif., assignor to Auto-View Welding Helmet Company, a corporation of California
Filed Aug. 29, 1960, Ser. No. 52,489
5 Claims. (Cl. 2—8)

This invention relates generally to welding helmets incorporating a mechanism for moving the conventional light filtering eye shield from the line of vision of the wearer to enable inspection of a work. More particularly, it has to do with an improved holding mechanism for temporarily securing the eye shield in its moved position out of the line of vision.

The present invention constitutes an improved mechanism over that disclosed in United States Patent No. 2,896,215, issued July 28, 1959, and entitled "Protective Hood."

Present day welding helmets include light filtering eye shields usually in the form of several layers of colored glass to protect the welder's eyes from the work. Ordinarily, the hood is pivoted to a head band support so that it may be readily swung back to move the eye shield from the line of vision and enable the welder to inspect the weld periodically. This action requires the use of one of the welder's hands resulting in inconvenience, wasted motion, and lost time, since one or more of the welding tools must be set aside in order to free the hand.

Solutions to the foregoing problem are disclosed in the above-mentioned patent. Briefly, this invention relates to a suitable mechanism within the welding hood adapted to be actuated by a chin rest for moving the light filtering eye shields from a first position in the line of vision of a welder to a second position out of the line of vision of a welder so that the welder's hands are at all times free. There are instances, however, in which it may be desired to maintain the eye shields in their removed or out-of-line-of-vision positions for a short period in order to permit a more complete inspection of a certain job. In this event, continued pressure by the wearer's chin on on the chin rest would ordinarily be necessary to hold the eye shields in their upward or out of the way position.

It is a primary object of this invention to provide an alternative mechanism for holding the eye shields in their out-of-the-line-of-vision positions.

More particularly, it is an object to provide a holding mechanism in which the eye shields may be automatically released through the chin operating structure itself to enable the eye shields to assume their normal in-line-of-vision positions without the necessity of the wearer manually re-positioning the holding mechanism.

Briefly, these and other objects and advantages of this invention are attained by providing eye shield means similar to those disclosed in the above-mentioned patent, in combination with a holding mechanism positioned on the front face of the welding helmet itself. This holding mechanism includes a movable shaft and guide structure therefor. The shaft projects into the helmet in a direction generally normal to the plane of the eye shields and in a position such that when the shaft is moved inwardly, it will engage the under edges of the eye shields to retain them in their out-of-the-line-of-vision positions. A biasing spring within the guide means is arranged to urge the shaft in an outward direction such that the shaft will move to this outward position free of the under edges of the eye shield means when the eye shield means are raised slightly higher by further depression of the chin operating structure. Thus, after the shaft has been released by the eye shields, the wearer need only relax pressure on the chin-operated structure to drop the eye shields into their in-line-of-vision positions.

A better understanding of the invention will be had by now referring to the accompanying drawings, in which.

Figure 1:
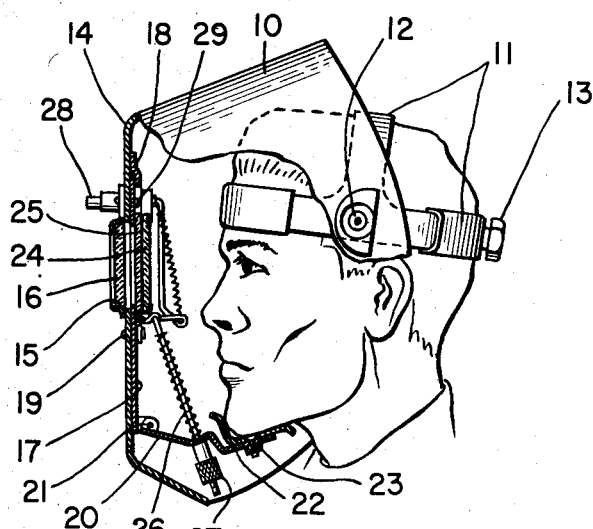
FIGURE 1 is a side view partly in cross section showing the welding helmet mechanism and improved holding structure of this invention.

Referring first to FIGURE 1, there is shown a welding hood 10 provided with the conventional head band structure 11 pivoted at 12 to the hood so that the hood may be swung from a position in front of the wearer's face to a position over his head. An adjustment knob 13 may be provided at the rear of the head band for adjusting the circumference thereof to fit a particular wearer's head. The front wall 14 of the hood 10 includes a conventional window frame 15 supporting a glass window 16.

Within the interior of the hood, there is provided a front frame structure 17 removably secured to the inside of the front wall 14 of the hood at its upper end by a flange 18 and towards its lower end by a simple turn screw 19. With this arrangement, the screw 19 may be rotated a quarter of a turn to permit the frame structure to be removed from the inside of the helmet for servicing or replacement.

As shown, there is included a chin operating structure 20 pivoted to the lower end of the front frame 17 as at 21. This structure extends rearwardly within the hood to terminate in a chin rest 22 which may be suitably adjusted by a screw 23 in accordance with the position of a wearer's chin when the head band 11 is positioned on the wearer's head. The arrangement is such that the wearer by lowering his chin may depress the chin operating structure to rotate the same about the pivot 21 in a clockwise direction as viewed in FIGURE 1.

The front frame 17 also supports eye shield means in the form of first and second eye shields 24 and 25 pivoted for swinging movement in their own plane, which as viewed in FIGURE 1, constitutes a plane normal to the plane of the drawing. This swinging action of the eye shields is accomplished through the medium of an actuating rod 26 passing through the chin-operated structure 20 and adjustably secured thereto as by a screw 27 so that depression of the chin rest 22 will pull the actuating rod 26 downwardly.

In accordance with the instant invention, the structure shown in FIGURE 1 is provided with a holding mechanism in the form of a manually operable button 28 for moving a shaft 29 generally into and out of the front face of the helmet 10. The manner in which this holding mechanism operates with respect to the eye shields 24 and 25 will become clearer by now referring to FIGURES 2, 3, 4, and 5.

Figures 2, 3:
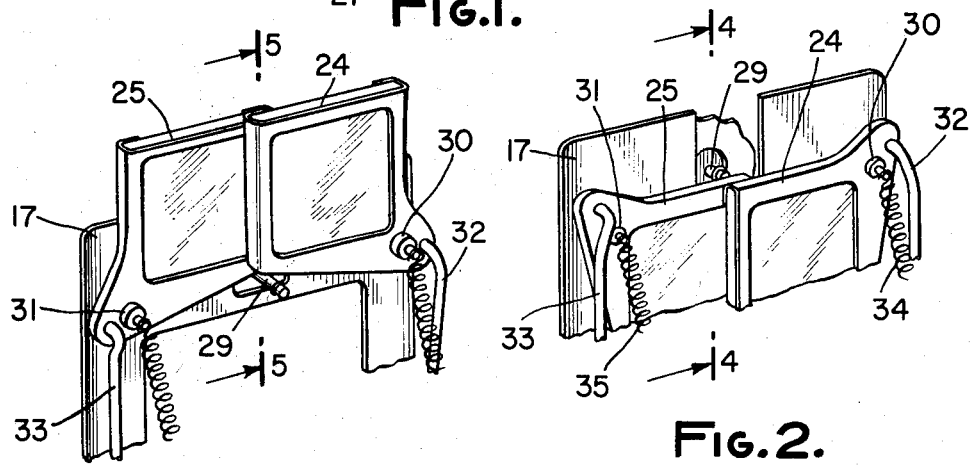
FIGURE 2 is an enlarged fragmentary perspective view showing the eye shields in a down or normal position in the line of vision of a wearer.
FIGURE 3 is another view similar to FIGURE 2 but showing the eye shields in a second raised position out of the line of vision of the wearer together with the holding mechanism for retaining the eye shields in this position.

Referring to FIGURE 2, it will be noted that the eye shields 24 and 25 are respectively pivoted as at 30 and 31 to the frame 17 for arcuate swinging movement. This movement is achieved by pull rods 32 and 33 secured to the eye shields, respectively, at spaced points so as to define force moment arms such that when the rods 32 and 33 are pulled downwardly, the eye shields 24 and 25 will swing from the first position shown in FIGURE 2 to a raised or second position as shown in FIGURE 3. The actuating rod 26 and chin-operated structure 20 illustrated in FIGURE 1 are coupled to each other and to the pull rods in such a manner as to effect the desired action when the wearer depresses the chin rest 22. Suitable springs 34 and 35 normally bias the eye shields 24 and 25 to their first or down positions in the line of vision of the wearer to protect his eyes.

In FIGURE 2, it will be noted that the shaft 29 does not interfere with the eye shields 24 and 25. In FIGURE 3, it will be noted that the shaft 29 protrudes inwardly so that it will engage the under edges of the eye shields 24 and 25 to support them in their upward position.

Figure 4:
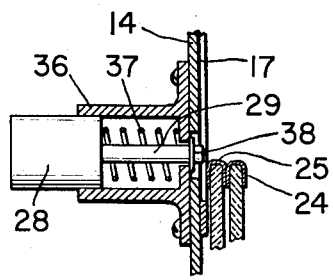
FIGURE 4 is a fragmentary cross section taken in the direction of the arrows 4—4 of FIGURE 2; and, FIGURE 5 is another fragmentary cross section taken in the direction of the arrows 5—5 of FIGURE 3.

With particular reference to FIGURE 4, the holding means includes a guiding structure 36 and cooperating biasing spring 37 normally urging the shaft 29 to its outer position so that the shaft will not interfere with movement of the eye shields 24 and 25 in their own plane. The right hand end portion of the shaft 29 includes an annular laterally projecting portion 28 generally in the shape of a washer structure locked to the shaft 29. This annular structure 38 engages the right hand end portion of the guide 36 to limit the outward or leftward extent of the shaft 29.

Figure 5:
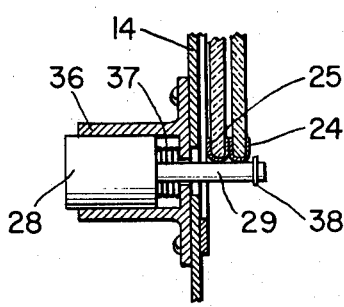

In FIGURE 5, it will be noted that this same annular projection 38 will engage a portion of the inside of the eye shield 24 when the eye shields are in their up position and the shaft 29 moved to the right to engage the under edges thereof. This projection thus prevents the spring 37 from simply moving the shaft 29 and button 28 to the left. The eye shields themselves thus hold the shaft in the operated position shown in FIGURE 5. It will be evident that if the eye shields 24 and 25 are raised slightly, the projection 38 will be released to release the shaft 29 and permit the spring 37 to return to its normal position shown in FIGURE 4 so that the eye shields may then be lowered.

The operation of the improved holding mechanism of this invention will be evident from the foregoing description. When it is desired to temporarily remove the eye shields from the wearer's line of vision, he simply depresses the chin rest 22 as described in connection with FIGURE 1 to raise the eye shields from the position shown in FIGURE 2 to the position shown in FIGURE 3. In this position, the wearer may then manually press inwardly on the button 28 to move the shaft 29 to the right as viewed in FIGURE 4 to the position illustrated in FIGURE 5 in which position the shaft will engage the under edges of the eye shields 24 and 25 when the wearer relaxes his chin pressure and thus retains the shields in their upward position.

When the wearer wishes to lower the eye shields, he need only depress the chin rest slightly further to raise the eye shields 24 and 25 just sufficiently to free the projection 38 and permit the spring 37 to move the shaft 29 back to the position shown in FIGURE 4. The wearer then relaxes his chin pressure and the biasing springs 34 and 35 of FIGURE 2 return the eye shields 24 and 25 to their normal first or downward position.

It will be evident from the foregoing that the present invention enables automatic repositioning of the eye shield means by the wearer's chin without the necessity of any further manual operations.

While only one particular embodiment of the invention has been described and shown, it will be evident to those skilled in the art that equivalent means falling clearly within the scope and spirit of the invention for holding the eye shields in their out-of-the-line-of-vision position will occur to those skilled in the art. The holding mechanism is therefore not to be thought of as limited specifically to the particular structure set forth merely for illustrative purposes.

What is claimed is:

1. In combination with a protective hood, a front frame supporting a pair of eye shields disposed adjacent to each other in a substantially common plane; means pivoting each eye shield to said frame such that swinging movement of each shield can take place in said plane from a first position in the line of vision of a wearer to a second position above said line of vision; actuating means coupled to said eye shields for moving them between said first and second positions; holding means including a manually operable shaft positioned on the front of said hood and passing into said hood normal to said plane; guide means supporting said shaft for movement from a first position clear of said eye shields to a second position passing through said plane of said eye shields immediately beneath said eye shields when said eye shields are in said second position for engaging the under edges of said eye shields to hold said eye shields in said second position.

2. The combination of claim 1, in which said actuating means includes pull rods for said eye shields having their upper ends coupled to said eye shields at points spaced a given distance from said pivot means so that a force moment arm is defined for swinging said eye shields from said first to said second position upon downward movement of said pull rods; and a chin operated structure pivoted to said frame and positioned to be engaged by a wearer's chin so that depression of said structure pulls said pull rods downwardly, whereby additional depression of said structure will raise said eye shields slightly above said second position to release said shaft for movement back to its first position to enable lowering of said eye shields.

3. The combination of claim 2, in which said shaft includes an annular laterally projecting structure engaging the inside of the lower edge of at least one of said eye shields and in which said guide means includes a biasing spring urging said shaft towards its first position whereby said shaft automatically returns to said first position when said eye shields are raised beyond said laterally projecting structure to release said shaft.

4. In combination with a protective hood, a front frame; eye shield means coupled to said frame for movement in a plane from a first position in the line of vision of a wearer to a second raised position above said line of vision; actuating means coupled to said eye shield means for moving said eye shield means between said first and second positions; holding means including a manually operable shaft positioned on the front of said hood and passing into said hood normal to said plane; guide means supporting said shaft for movement from a first position clear of said eye shield means to a second position adjacent to said plane of said eye shield means when said eye shield means are in said second position for engaging a portion of said eye shield means to hold said eye shield means in said second position.

5. The combination of claim 4, in which said shaft includes a laterally projecting structure for engaging said portion of said eye shield means and in which said guide means includes a biasing spring urging said shaft towards said first position, whereby said shaft automatically returns to said first position when said eye shield means are raised beyond said upwardly laterally projecting structure to release said shaft.

References Cited in the file of this patent

UNITED STATES PATENTS

| 1,842,675 | Kannenberg | Jan. 26, 1932 |
| 2,588,553 | McWithy | Mar. 11, 1952 |
| 2,896,215 | Fernandez | July 28, 1958 |